(12) United States Patent
Ukai et al.

(10) Patent No.: US 8,999,047 B2
(45) Date of Patent: Apr. 7, 2015

(54) SYSTEM FOR PROCESSING MERCURY IN FLUE GAS

(75) Inventors: Nobuyuki Ukai, Tokyo (JP); Seiji Kagawa, Tokyo (JP); Tatsuto Nagayasu, Tokyo (JP); Takuya Okamoto, Tokyo (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 0 days.

(21) Appl. No.: 13/817,746

(22) PCT Filed: Oct. 15, 2010

(86) PCT No.: PCT/JP2010/068183
§ 371 (c)(1),
(2), (4) Date: Feb. 19, 2013

(87) PCT Pub. No.: WO2012/049774
PCT Pub. Date: Apr. 19, 2012

(65) Prior Publication Data
US 2013/0149206 A1    Jun. 13, 2013

(51) Int. Cl.
*B01D 53/64* (2006.01)
*B01D 53/75* (2006.01)
*B01D 53/50* (2006.01)
*B01D 53/86* (2006.01)
*C02F 103/18* (2006.01)

(52) U.S. Cl.
CPC .............. *B01D 53/64* (2013.01); *B01D 53/75* (2013.01); *B01D 53/50* (2013.01); *B01D 53/8625* (2013.01); *B01D 2251/206* (2013.01); *B01D 2257/302* (2013.01); *B01D 2257/404* (2013.01); *B01D 2257/602* (2013.01); *B01D 2258/0283* (2013.01); *C02F 2103/18* (2013.01); *Y02C 20/10* (2013.01)

(58) Field of Classification Search
None
See application file for complete search history.

(56) References Cited

U.S. PATENT DOCUMENTS

2011/0044872 A1*    2/2011    Ukai et al. .............. 423/235

FOREIGN PATENT DOCUMENTS

| CN | 101678273 A |   | 3/2010 |
| JP | 50-32087 B |   | 3/1975 |
| JP | 2004-313833 A |   | 11/2004 |
| JP | 2008-142602 A |   | 6/2008 |
| JP | 2008-178785 A |   | 8/2008 |
| JP | 2009106898 A |   | 5/2009 |
| JP | 2009-166012 A |   | 7/2009 |
| JP | 2009166012 A | * | 7/2009 |

(Continued)

OTHER PUBLICATIONS

English translation of JP 2010-125377 A.*

(Continued)

*Primary Examiner* — Duane Smith
*Assistant Examiner* — Cabrena Holecek
(74) *Attorney, Agent, or Firm* — Westerman, Hattori, Daniels & Adrian, LLP (57) ABSTRACT

A system for removing Hg contained in flue gas from a boiler, the system includes: a heat exchanger for performing heat exchange of the flue gas from the boiler; a precipitator for removing soot and dust in the flue gas; a wet desulfurization device for removing mercury oxide $Hg^{2+}$ in the flue gas using an alkali absorbent; and; a removal assistant supply unit for supplying a removal assistant for removing impurities into a limestone and gypsum slurry that circulates through the wet desulfurization device.

7 Claims, 6 Drawing Sheets

(56) References Cited

FOREIGN PATENT DOCUMENTS

| | | | |
|---|---|---|---|
| JP | 2009-202107 A | | 9/2009 |
| JP | 2010-125377 A | | 6/2010 |
| JP | 2010125377 A | * | 6/2010 |
| WO | 2009/130815 A | | 10/2009 |
| WO | 2010/150424 A1 | | 12/2010 |

OTHER PUBLICATIONS

Merriam-Webster definition "line" pdf.*

Merriam-Webster definition "circulation" pdf.*

Christian Vargel, Corrosion of Aluminum, 2004, Elsevier, p. 158.*

"What are Humic Substances?", 2007, International Humic Substances Society.*

International Search Report of PCT/JP2010/068183, mailing date of Dec. 28, 2010.

Written Opinion of PCT/JP2010/068183, mailing date of Dec. 28, 2010.

English Translation of the Written Opinion of PCT/JP2010/068183 dated Dec. 28, 2010. (6 pages).

JP Office Action dated Dec. 3, 2013, issued in corresponding Japanese application No. 2012-538543, w/ English translation.

Office Action dated Apr. 30, 2014, issued in Corresponding Chinese Patent Application No. 201080068581.2, with English Translation (23 pages).

Japanese Office Action dated Nov. 4, 2014, issued in Japanese Application No. 2012-538543; w/English Translation. (7 pages).

Canadian Notice of Allowance dated Jan. 21, 2015, issued in Canadian Patent Application No. 2808563. (2 pages).

Japanese Notice of Allowance dated Feb. 3, 2015, issued in Japanese Application No. 2012-538543; w/English Translation. (3 pages).

* cited by examiner

SYSTEM FOR PROCESSING MERCURY IN FLUE GAS

FIELD

The present invention relates to a system for processing mercury in flue gas that can eliminate mercury in flue gas to low concentration.

BACKGROUND

Coal-fired flue gas and flue gas generated by burning heavy fuel oil may contain metallic mercury ($Hg^0$) as well as dust, sulfur oxide (SOx), and nitrogen oxide (NOx). In recent years, various proposals have been made on methods and devices for treating the metallic mercury) ($Hg^0$), in combination with a denitration device that reduces NOx and a wet desulfurization device that uses an alkali absorbent as a SOx absorbent.

As a method for treating metallic mercury ($Hg^0$) in flue gas, a method including spraying $NH_4Cl$ solution in liquid state into a flue gas duct in the upstream process of a reduction denitration device to supply it into a flue gas duct has been proposed (for example, see Patent Literatures 1 and 2). When a $NH_4Cl$ solution in liquid state is sprayed into a flue gas duct, $NH_4Cl$ is dissociated to produce ammonia ($NH_3$) gas and hydrogen chloride (HCl) gas. $NH_3$ gas functions as a reducing agent while HCl gas functions as a mercury chlorinating agent (that is, oxidation assistant). Specifically, on a denitration catalyst filled into the reduction denitration device, $NH_3$ is reduced with NOx in the flue gas as represented in the following formula 1, and HCl is oxidized with $Hg^0$ in the flue gas as represented in the following formula 2. When $NH_3$ is subjected to reduction nitration on a denitration catalyst, the metallic mercury ($Hg^0$) is also oxidized to give water soluble mercury dichloride ($HgCl_2$), and then with a wet desulfurization device installed in the downstream, $HgCl_2$ is dissolved in a limestone and gypsum slurry as an absorbent, and therefore mercury contained in the flue gas is removed.

$$4NO + 4NH_3 + O_2 \rightarrow 4N_2 + 6H_2O \quad (1)$$

$$Hg^0 + \tfrac{1}{2}O_2 + 2HCl \rightarrow HgCl_2 + H_2O \quad (2)$$

Further, with regard to a desulfurization device for absorbing and removing sulfur oxides in flue gas by contacting flue gas with limestone and gypsum slurry of an absorbent, when hyperoxidized state occurs in an absorber, part of mercury oxide ($Hg^{2+}$), which is water soluble, may turn into insoluble metallic mercury ($Hg^0$) and is discharged from a stack to the outside.

In this regard, when a reduction state occurs in an absorber, part of mercury oxide ($Hg^{2+}$), which is water soluble, may turn into insoluble metallic mercury ($Hg^0$) and is discharged from a stack to the outside.

As a means for dealing with such problem, having an oxidation state in the absorber can suppress the aforementioned phenomenon (that is, reduction of mercury oxide to metallic mercury and discharge from a stack to the outside).

However, according to conventional methods, the oxidation state may progress excessively, so that it is prone to have a hyperoxidation state, and also sulfur dioxide gas $SO_2$ and selenium compound from flue gas, that are absorbed into an absorbent, are hyperoxidized to yield $Se^{6+}$, $S_2O_6^{2-}$, and $S_2O_8^{2-}$. As they are in stable form and difficult to be processed by waste water processing, it is necessary to prevent in advance their production. To do so, it is required to control the oxidation and reduction state so that a hyperoxidation state is not yielded.

Accordingly, a method of canceling a hyperoxidation state in an absorber is suggested, in which, when the hyperoxidation state is caused and an operation reference value in an absorber exceeds a given range, at least one process of the method for canceling a hyperoxidation state in an absorber that is composed of the followings are performed: automatically adjusting soot and dust removing amount from flue gas taken into a flue gas desulfurization device, automatically adjusting an absorbent slurry circulation amount, reducing an oxidizing air flow rate fed to the absorbers, automatically adjusting an absorbent slurry amount fed to the absorbers, and increasing the absorbent slurry amount fed to a dehydrating unit (Patent Literature 3).

CITATION LIST

Patent Literature

Patent Literature 1: Japanese Patent Application Laid-open No. 2008-142602
Patent Literature 2: Japanese Patent Application Laid-open No. 2009-202107
Patent Literature 3: Japanese Patent Application Laid-open No. 2008-178785

SUMMARY

Technical Problem

Even when a hyperoxidation state in an absorber is eliminated as suggested in Patent Literature 3, there is still a problem that the oxidized products produced already in a hyperoxidation state, for example, sulfur oxides such as dithionate and peroxo disulfate ($S_2O_6^{2-}$ and $S_2O_8^{2-}$) and hexavalent selenium ($Se^{6+}$) cannot be removed by reduction.

The present invention is devised in view of the above problems, and an object of the invention is to provide a system for processing mercury in flue gas which is capable of removing mercury in the flue gas to low concentration while oxidation inhibition in a desulfurization device is suppressed without having a hyperoxidation state.

Solution to Problem

According to a first aspect of the present invention in order to solve the problems, there is provided a system for removing Hg which removes Hg contained in flue gas from a boiler, the system including: a heat exchanger that performs heat exchange of the flue gas from the boiler; a precipitator that removes soot and dust in the flue gas; a wet desulfurization device that removes mercury oxide $Hg^{2+}$ in the flue gas using an alkali absorbent; and a removal assistant supply means that supplies a removal assistant for removing impurities into a limestone and gypsum slurry that circulates through the wet desulfurization device.

According to a second aspect of the present invention, there is provided the system for processing mercury in the flue gas according to the first aspect, comprising a denitration means having a denitration catalyst for oxidizing metallic mercury ($Hg^0$) by denitration of NOx in the flue gas.

According to a third aspect of the present invention, there is provided the system for processing mercury in the flue gas according to the second aspect, including a reduction oxidation assistant supply means for supplying a reduction oxidation assistant to a flue gas duct in the downstream of the boiler, wherein NOx in the flue gas is reduced with the reduction assistant by the denitration means and also the metallic mercury ($Hg^0$) is oxidized in the coexistence of an oxidation assistant.

According to a fourth aspect of the present invention, there is provided the system for processing mercury in the flue gas according to any one of the first to third aspects, wherein a plurality types of removal assistants are used.

According to a fifth aspect of the present invention, there is provided the system for processing mercury in the flue gas according to any one of the first to fourth aspects, wherein supply amount of the removal assistant is carried out while determining the oxidation reduction state of the limestone and gypsum slurry.

According to a six aspect of the present invention, there is provided the system for processing mercury in the flue gas according to any one of the first to fifth aspects, wherein the oxidation reduction state in the desulfurization device is determined by oxidation reduction potential (ORP) of the limestone and gypsum slurry or sulfurous acid ion ($SO_3^{2-}$) concentration.

According to a seventh aspect of the present invention, there is provided the system for processing mercury in the flue gas according to any one of the first to sixth aspects, wherein a plurality types of removal assistant are used.

Advantageous Effects of Invention

According to the system for processing mercury in flue gas according to the invention, impurities are removed by supplying a removal assistant for removing impurities in a limestone and gypsum slurry, oxidation inhibition occurring in a wet desulfurization device is suppressed, and it is unnecessary to have a hyperoxidation state, and therefore production of sulfur oxides such as dithionate and peroxo disulfate ($S_2O_6^{2-}$ and $S_2O_8^{2-}$) and hexavalent selenium ($Se^{6+}$), that are difficult to be processed, can be suppressed.

DESCRIPTION OF EMBODIMENTS

Hereinafter, examples of a system for processing mercury in flue gas relating to the invention will be described in more detail with reference to the drawings. However, the invention is not limited to the examples.

EXAMPLES

Figure 1:
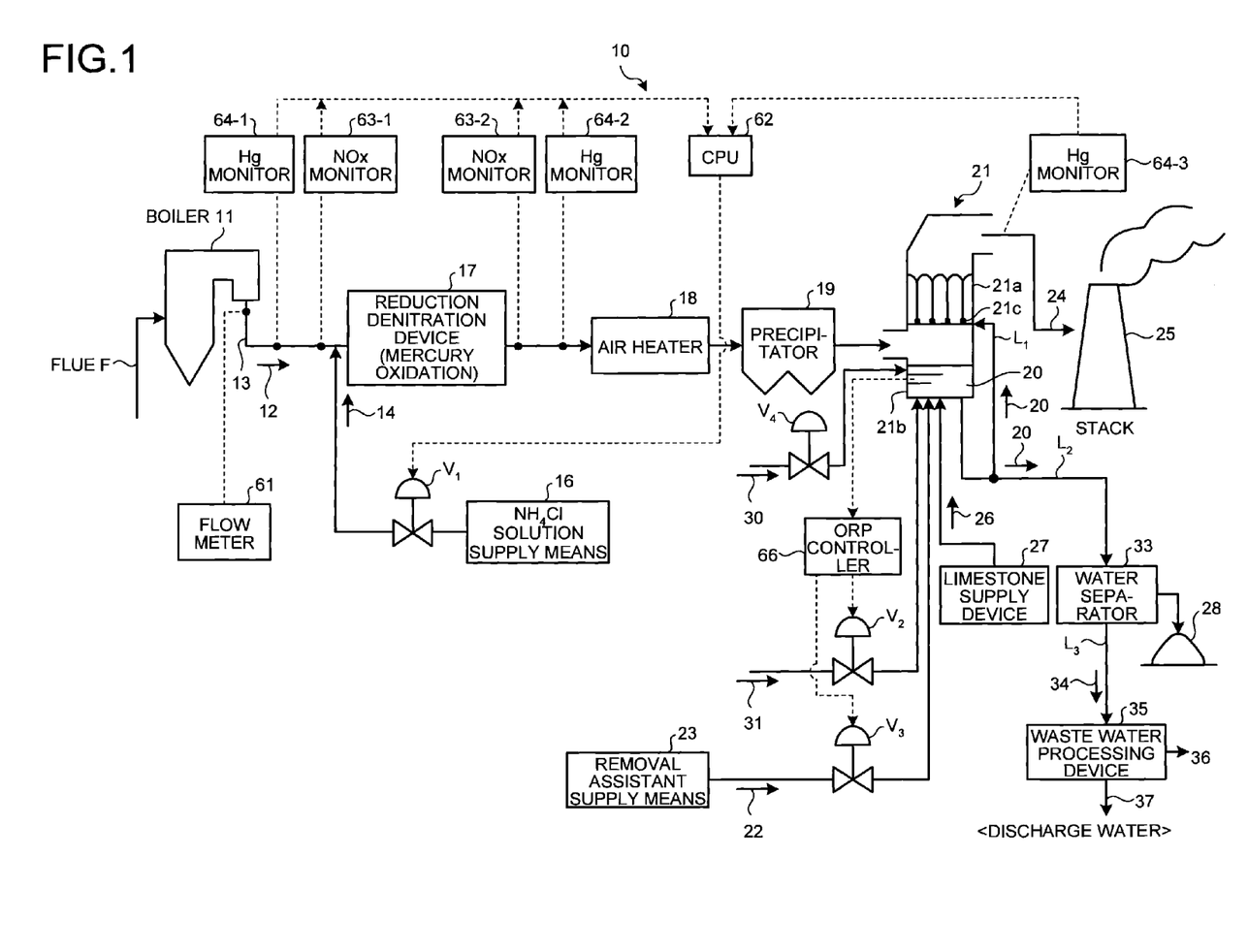
FIG. 1 is a schematic drawing of a system for processing mercury in flue gas according to the examples of the invention.

The system for processing mercury in flue gas according to Examples of the invention will be described with reference to the accompanying drawings. FIG. 1 is a schematic drawing of a system for processing mercury in flue gas according to Example 1 of the invention. As illustrated in FIG. 1, a mercury processing system 10 in flue gas according to the Examples of the invention is a Hg removal system which removes Hg contained in a flue gas 12 from a boiler 11 in which fuel (for example, coals) F is supplied and burned, and the system includes an ammonium chloride ($NH_4Cl$) solution supply means (a reduction oxidation assistant supply means) 16 that sprays an $NH_4Cl$ solution 14, which contains ammonium chloride ($NH_4Cl$) as a reduction oxidation assistant, into a flue gas duct 13 that is in the downstream of the boiler 11; a reduction denitration device (a reduction denitration means) 17 that includes a denitration catalyst which reduces NOx in the flue gas 12 with an $NH_3$ gas, while oxidizing metallic mercury ($Hg^0$) in the coexistence of an HCl gas; a heat exchanger (that is, air heater: AH) 18 that performs heat exchange of the denitrated flue gas 12; a precipitator (ESP: Electrostatic Precipitator, BF: Bag Filter or the like) 19 that removes soot and dust in the denitrated flue gas 12; a wet desulfurization device 21 that removes divalent $Hg^{2+}$, which is oxidized in the reduction denitration device 17, using a limestone and gypsum slurry (an alkali absorbent) 20; and a removal assistant supply means 23 that supplies a removal assistant 22 for removing impurities into the limestone and gypsum slurry 20 that circulates through the wet desulfurization device 21. In addition, $V_1$ to $V_4$ in FIG. 1 illustrate valves for opening and closing.

According to the present example, by removing impurities according to supply of the removal assistant 22 for removing impurities in the limestone and gypsum slurry 20, oxidation inhibition in the wet desulfurization device 21 can be suppressed. Further, as it is unnecessary to have a hyperoxidation state, production of sulfur oxides such as dithionate and peroxo disulfate ($S_2O_6^{2-}$ and $S_2O_3^{2-}$) and hexavalent selenium ($Se^{6+}$), that are difficult to be processed, can be suppressed.

Examples of the removal assistant 22 used for removing impurities may include active carbon 22A and an aggregation assistant 22B.

As described herein, examples of the impurities to be removed in the invention may include mercury or a reducing material which causes oxidation inhibition, and examples of the reducing material may include a humic material.

Examples of the impurities may include unburnt hydrocarbons and aromatic organic compounds such as tannin.

Figure 2:
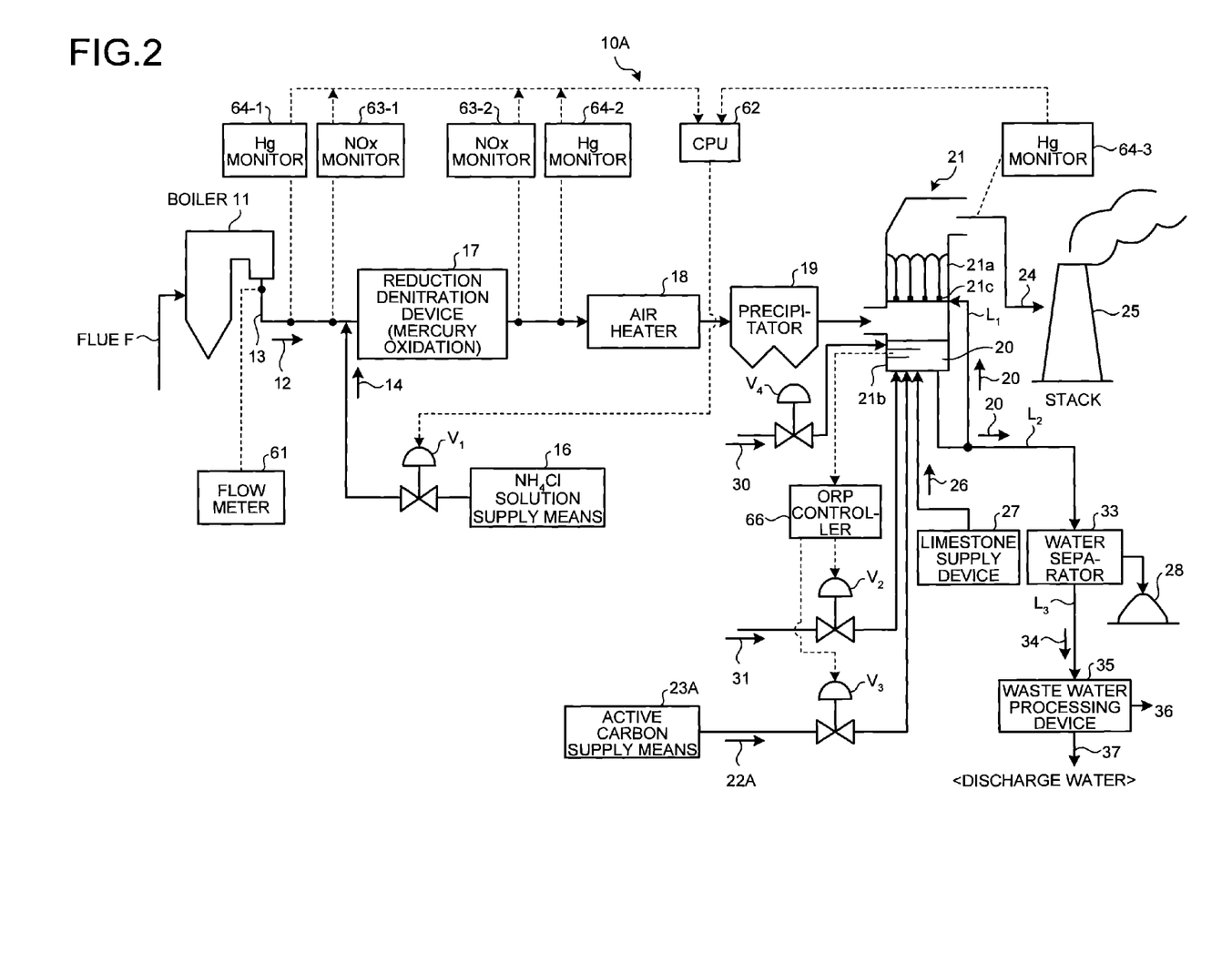
FIG. 2 is a schematic drawing of a system for processing mercury in flue gas according to the examples of the invention.

FIG. 2 is a schematic drawing of a system 10A for processing mercury in flue gas in which the active carbon 22A is used as the removal assistant 22.

Figure 3:
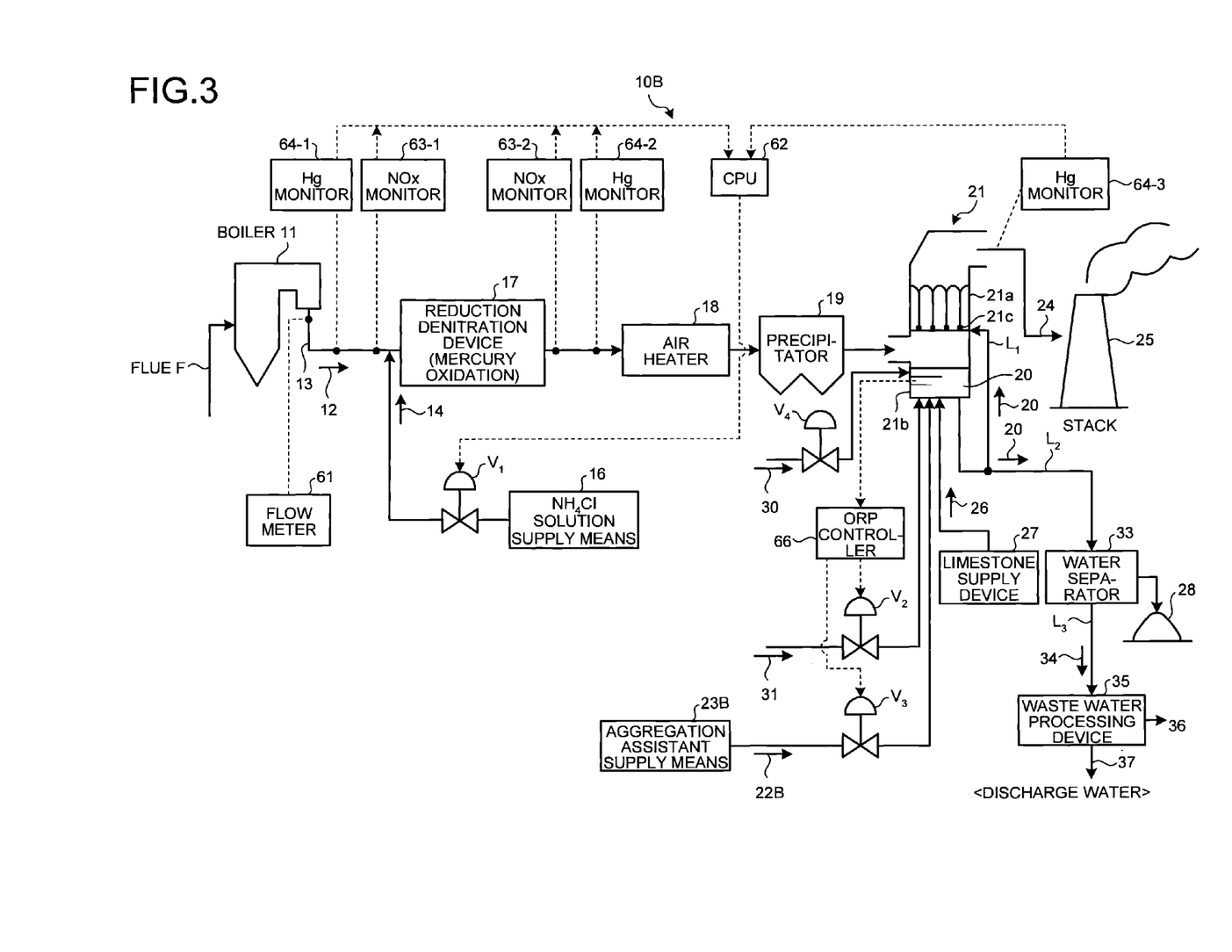
FIG. 3 is a schematic drawing of a system for processing mercury in flue gas according to the examples of the invention.

FIG. 3 is a schematic drawing of the system 10A for processing mercury in flue gas in which the aggregation assistant 22B is used as the removal assistant 22.

In the following explanations for the examples, the system 10A for processing mercury in flue gas in which the active carbon 22A is used as illustrated in FIG. 2, is described in view of the drawing.

In the system 10A for processing mercury in flue gas according to the present example, $NH_4Cl$ is used as an exemplary reduction oxidation assistant. However, the present example is not limited thereto. Regarding the reduction oxidation assistant, any assistant which can produce an oxidation assistant and a reduction assistant upon vaporization can be used. Further, according to the present example, the reduction oxidation assistant indicates those functioning as an oxidation assistant used for oxidizing metallic mercury ($Hg^0$) in coexistence of an oxidation assistant and also as a reducing agent for reducing NOx with an aid of a reduction assistant. In the present example, HCl gas is used as an oxidation assistant while $NH_3$ gas is used as a reduction assistant.

Thus, it is also possible that the oxidation assistant (HCl gas) and the reduction assistant ($NH_3$ gas) are added separately.

To the flue gas 12 discharged from the boiler 11, a $NH_4Cl$ solution 14 is supplied via a $NH_4Cl$ solution supply means 16. The supply of $NH_4Cl$ solution 14 b the $NH_4Cl$ solution supply means 16 is performed by a spray means (not illustrated) for oxidizing $Hg^0$ in the flue gas 12. The spray means is installed in a flue gas duct 13 and uses, for example, a binary nozzle, for simultaneously spraying the $NH_4Cl$ solution 14 and air into the flue gas duct 13.

The liquid droplets of the $NH_4Cl$ solution 14 which has been sprayed from the spraying means into the flue gas duct 13 generate fine $NH_4Cl$ solid particles, because the liquid droplets are evaporated and vaporized by the high ambient temperature of the flue gas 12, and like the following formula 3, decomposed into HCl and $NH_3$. Accordingly, the $NH_4Cl$ solution 14 sprayed from the spraying means is decomposed and generates HCl and $NH_3$, and as a result it can supply $NH_3$ gas and HCl gas into the flue gas duct 13.

Further, according to the flue gas condition, one or both of the oxidation assistant (HCl gas) and the reduction assistant ($NH_3$ gas) may be introduced as required.

$$NH_4Cl \rightarrow NH_3 + HCl \quad (3)$$

The temperature of the flue gas 12 in the flue gas duct 13 is, although may vary depending on the combustion condition of the boiler 11, preferably 320° C. or more and 420° C. or less, more preferably 320° C. or more and 380° C. or less, and still more preferably 350° C. or more and 380° C. or less, for example. The reason is that, within those temperature ranges, the oxidation reaction of Hg and the denitration reaction of NOx on a denitration catalyst can be carried out with efficiency.

Further, after the flue gas 12 picks up the HCl gas and $NH_3$ gas that are generated from liquid droplets of the $NH_4Cl$ solution 14 sprayed from the $NH_4Cl$ solution supply means 16 into the flue gas duct 13, it is fed to the reduction denitration device 17. By the reduction denitration device 17, the $NH_3$ gas generated by decomposition of $NH_4Cl$ is used for reduction denitration of NOx and the HCl gas is used for oxidation of Hg, and as a result, NOx and Hg are removed from the flue gas 12.

Specifically, on the denitration catalyst filled on denitration catalyst layer which is filled in the reduction denitration device 17, $NH_3$ gas is used for reduction denitration of NOx as represented in the following formula 4 while Hg is oxidized by HCl gas as represented in the following formula 5.

$$4NO + 4NH_3 + O_2 \rightarrow N_2 + 6H_2O \quad (4)$$

$$Hg + \tfrac{1}{2}O_2 + 2HCl \rightarrow HgCl_2 + H_2O \quad (5)$$

In the reduction denitration device 17, after having reduction of NOx and oxidation of Hg in the flue gas 12, respectively, the flue gas 12 passes through an air heater 18 and the precipitator (ESP) 19 and fed to the wet desulfurization device 21. Further, between the air heater 18 and the precipitator (ESP) 19, a heat recovering device may be installed.

Then, after the precipitation by the precipitator (ESP) 19, the flue gas 12 is sent to the wet desulfurization device 21 to be subjected to desulfurization.

In the wet desulfurization device 21, the flue gas 12 is fed from the wall side of a column bottom part 21b in a main body 21a of the device, and the limestone and gypsum slurry 20, which is used as an alkali absorbent, is supplied into the main body 21a of the device via an absorbent feed line ($L_1$), so that a jetting flow from a nozzle 21c toward the column top part is formed. The flue gas 12 rising from the bottom part of the main body 21a of the device and the limestone and gypsum slurry 20 jetted and flown down from the nozzle 21c are subjected to gas and solid contact in opposite direction, and $HgCl_2$ and sulfur oxides (SOx) in the flue gas 12 are absorbed into the limestone and gypsum slurry 20, so that they can be separated and removed from the flue gas 12. As a result, the flue gas 12 is purified. The flue gas 12 purified by the limestone and gypsum slurry 20 is discharged from the column top part and, as purified gas 24, eventually discharged from the system via a stack 25 to the outside.

Meanwhile, limestone 26 filled into the main body 21a of the device is supplied from a limestone supply device 27.

The limestone and gypsum slurry 20 used for desulfurization of the flue gas 12 is produced by mixing limestone slurry $CaCO_3$ in which limestone powder is dissolved in water and gypsum slurry $CaSO_4$ in which limestone and SOx in the flue gas 12 are reacted for further oxidation with water. As for the limestone and gypsum slurry 20, liquid obtained by pumping the liquid left at the column bottom part 21b of the main body 21a of the wet desulfurization device 21 is used. In the main body 21a of the device, SOx in the flue gas 12 induces the reaction as the following formula 6 together with the limestone ($CaCO_3$) contained in the limestone and gypsum slurry 20.

$$CaCO_3 + SO_2 + 0.5H_2O \rightarrow CaSO_3 \cdot 0.5H_2O + CO_2 \quad (6)$$

Meanwhile, the limestone and gypsum slurry 20 after absorbing SOx in the flue gas 12 is mixed with water 30 which is supplied to the main body 21a of the device, and then oxidized by air 31 supplied to the column bottom part 21b of the main body 21a of the device. At that time, the limestone and gypsum slurry 20 flown down along the inside of the main body 21a of the device induces the reaction as the following formula 7 together with the water 30 and the air 31.

$$CaSO_3 \cdot 0.5H_2O + 0.5O_2 + 1.5H_2O \rightarrow CaSO_4 \cdot 2H_2O \quad (7)$$

Accordingly, SOx in the flue gas 12 is captured in the form of gypsum $CaSO_4 \cdot 2H_2O$ by the wet desulfurization device 21.

At that time, as the mercury chloride ($HgCl_2$) in the flue gas 12 is water soluble, it moves toward the limestone and gypsum slurry 20 side.

The limestone and gypsum slurry 20 left at the column bottom part 21b of the wet desulfurization device 21 and used for desulfurization is subjected to an oxidation treatment, and then drawn off from the column bottom part 21b. The drawn-off limestone and gypsum slurry 20 is fed to a water separator 33 and then discharged from the system as dehydration cake (gypsum) 28 containing mercury chloride ($HgCl_2$) to the outside.

As for the water separator 33, a belt filter or the like is used, for example. Further, a filtrate after dehydration (that is, dehydrated filtrate) 34 is subjected to an operation like removal of suspended materials, heavy metals 36, or the like in dehydrated filtrate, and pH control of dehydrated filtrate by using a waste water processing device 35. Part of a waste water 37 after the waste water processing is brought back to the wet desulfurization device 21 and remaining part is processed as the waste water 37.

Although the limestone and gypsum slurry 20 is used as an alkali absorbent in the present example, other solution can be also used as an alkali absorbent if it can absorb $HgCl_2$ in the flue gas 12.

Method for supplying the limestone and gypsum slurry 20 is not limited to the method of having jet flow from the nozzle 21c toward the column top part. Instead, it may be flown down from the nozzle 21c to be in an opposite direction with the flue gas 12.

In the upstream of the spraying means, a flow meter 61 for measuring flow amount of the flue gas 12 is installed. With the flow meter 61, the flow amount of the flue gas 12 is measured. The flow amount value of the flue gas 12 that is measured by the flow meter 61 is sent to a control device 62, and based on the flow amount value of the flue gas 12, the flow amount of $NH_4Cl$ solution 14 to be sprayed or the like can be adjusted.

At the entrance and exit of the reduction denitration device 17, NOx concentration measuring units 63-1 and 63-2 are installed. Concentration values of NOx in flue gas measured by the NOx concentration measuring units 63-1 and 63-2 are sent to the control device 62. According to the control device 62, reduction ratio of NOx in the reduction denitration device 17 can be determined based on the NOx concentration values in the flue gas 12 measured by the NOx concentration measuring units 63-1 and 63-2. Accordingly, by controlling $NH_4Cl$ concentration, supply flow amount, or the like of the $NH_4Cl$ solution 14 based on the NOx concentration values in the flue gas 12 that is measured by the NOx concentration measuring units 63-1 and 63-2, the supply amount of $NH_4Cl$ in the $NH_4Cl$ solution 14 to be sprayed can be adjusted to satisfy the pre-determined denitration performance.

Meanwhile, in the flue gas duct 13, mercury (Hg) concentration measuring units 64-1, 64-2, and 64-3 for measuring Hg content in the flue gas 12 discharged from the boiler 11 are installed. The Hg concentration measuring unit 64-1 is installed in the flue gas duct 13 between the boiler 11 and the $NH_4Cl$ solution supply part, the Hg concentration measuring unit 64-2 is installed between the reduction denitration device 17 and the heat exchanger 18, and the Hg concentration measuring unit 64-3 is installed in the downstream of the wet desulfurization device 21. Concentration values of Hg ($Hg^{2+}$, $Hg^0$) in the flue gas 12 measured by the Hg concentration measuring units 64-1, 64-2, and 64-3 are sent to the control device 62. According to the control device 62, content of Hg contained in the flue gas 12 can be determined from the Hg concentration values in the flue gas 12 measured by the Hg concentration measuring units 64-1, 64-2, and 64-3. By controlling $NH_4Cl$ concentration, supply flow amount, or the like of the $NH_4Cl$ solution 14 based on the Hg ($Hg^{2+}$, $Hg^0$) concentration values in the flue gas 12 measured by the Hg concentration measuring units 64-1, 64-2, and 64-3, the concentration and supply amount of $NH_4Cl$ in the $NH_4Cl$ solution 14 to be sprayed can be adjusted to satisfy the pre-determined denitration performance and also to maintain the oxidization performance of Hg.

Further, in the column bottom part 21b of the wet desulfurization device 21, a device for measurement and control of oxidation reduction potential (that is, ORP controller) 66 for measuring oxidation reduction potential of the limestone and gypsum slurry 20 is installed. With the ORP controller 66, oxidation reduction potential value of the limestone and gypsum slurry 20 is measured. Based on the measured oxidation reduction potential value, supply amount of air 31 supplied to the column bottom part 21b of the wet desulfurization device 21 is controlled. By controlling the supply amount of the air 31 supplied to the column bottom part 21b, reduction of oxidized Hg, that is captured within the limestone and gypsum slurry 20 remaining on the column bottom part 21b of the wet desulfurization device 21, is prevented, and thus its release from the stack 25 can be prevented.

The oxidation reduction potential of the limestone and gypsum slurry 20 in the wet desulfurization device 21 is, to prevent re-release of Hg from the limestone and gypsum slurry 20, preferably in the range of 0 mV or more and +600 mV or less, for example. The reason is that such oxidation reduction potential is a range in which Hg captured as $HgCl_2$ in the limestone and gypsum slurry 20 is stably present and re-release into atmosphere can be prevented.

Meanwhile, although $NH_4Cl$ is used as a reduction oxidation assistant in the system 10 for processing mercury in flue gas according to the invention, ammonium halide other than $NH_4Cl$, that is, ammonium bromide ($NH_4Br$) and ammonium iodide ($NH_4I$), can be also used as a reduction oxidation assistant and a solution in which they are dissolved in water can be also used.

According to the present example, an active carbon supply means 23 for supplying active carbon 22A into the limestone and gypsum slurry 20 as an absorbent that circulates through the wet desulfurization device 21 is installed to remove humic materials by the active carbon 22A added. As a result, the oxidation inhibition in the wet desulfurization device 21 is suppressed.

Although the present example is related to a flue gas processing technique which requires mercury oxidation as a denitration means, the invention is not limited to it. In case of flue gas with low NOx, it can be applied for a case in which a denitration means is not installed.

Further, even when a denitration means is installed, mercury oxidation is progressed by halogen compound (HC1 or the like) originally contained in the flue gas, and the oxidized mercury ($Hg^{2+}$) can be also removed from the flue gas based on gas and solid contact using the desulfurization device 21. Thus, it can be also applied to processing of high halogen compound (for example, HC1 gas) which does not require a mercury oxidization assistant.

Figure 4:
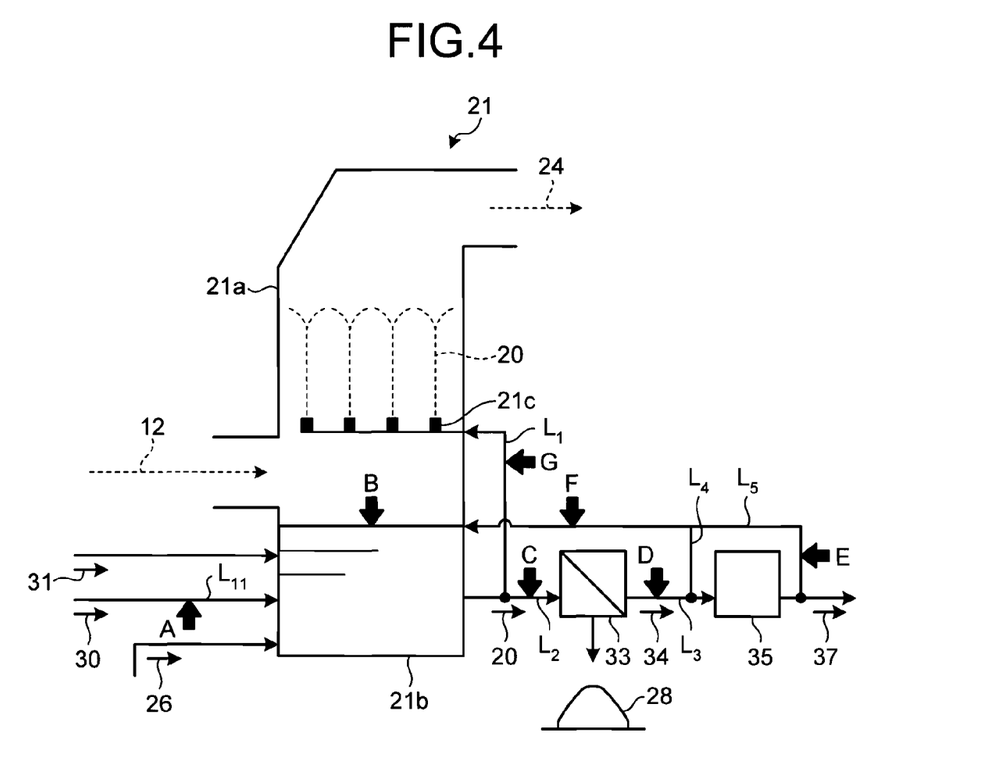
FIG. 4 is a diagram of a wet desulfurization device according to the examples of the invention.

FIG. 4 is a diagram of the wet desulfurization device 21 according to the present example of the invention.

As illustrated in FIG. 4, the contact point for contacting the active carbon 22A in the limestone and gypsum slurry 20 as an absorbent that circulates through the wet desulfurization device 21 includes A to G as a respective addition point.

Herein, the addition point A is a supply line $L_{11}$ for the water 30.

The addition point B is inside an oxidation basin of the column bottom part 21b in the main body 21a of the device.

The addition point C is a draw line $L_2$ for the limestone and gypsum slurry 20.

The addition points D and E are a dehydration processing lines $L_3$ and $L_4$ for the limestone and gypsum slurry 20.

The addition point F is a circulation line $L_5$ for the limestone and gypsum slurry 20.

The addition point G is a circulation line $L_1$ for the limestone and gypsum slurry 20.

The active carbon 22A is added by the active carbon supply means 23 via at least one addition positions described above.

Herein, among the addition points A to G, more preferred addition point is the addition point A. The reason is that, since the humic materials can be brought into contact with active carbon under the condition in which limestone and gypsum slurry is not co-present, higher contact efficiency can be obtained.

As explained in the above, according to the invention the humic materials causing oxidation inhibition are removed by the active carbon 22A so that an occurrence of oxidation inhibition during desulfurization reaction is prevented in advance.

The humic materials are organic polymer materials containing a large amount of phenolic hydroxy group, which exhibit a reducing activity (=oxidation inhibition). For such reasons, by removing the humic materials, an occurrence of oxidation inhibition is prevented in advance.

The humic materials are incorporated because river water is used as the water 30 supplied to the wet desulfurization device 21. In river water, lots of impurities including humic materials are included. The humic materials are present in soil, river water, lake, underground water, sea water, and soil sediments, or the like and have a reducing activity. Thus, for oxidation processing of SOx in the limestone and gypsum slurry 20 which has been used for desulfurization, if the humic materials are contained in the river water, oxidation of SOx in the limestone and gypsum slurry 20 may be inhibited by the humic materials. Therefore, it is desirable to remove the humic materials by the active carbon 22A.

In the humic materials, natural polymer organic materials that are produced by decomposition of lignin or the like, which is contained in grasses and trees of agricultural field or forest, are included. Examples of the natural polymer organic materials include humic acid and fulvic acid. In addition, the humic materials have a reducing activity.

Thus, according to the invention, the humic materials refer to materials like organic materials that are included in natural water like river water and lake water.

Conventionally, as a solution to deal with the reducing property of humic materials, a method of improving an oxidizing property by supply of an oxidizing agent and canceling both properties has been suggested. However, according to the invention, as a solution to deal with the reducing property of humic materials, the humic materials themselves are removed by active carbon, and thus the mechanism and working effect of the processing itself are completely different from those described above.

In addition, as the active carbon is added to inside of a desulfurization device, inside of a system for drawing and circulating an absorbent, and a system for dehydration and discharge of an absorbent, it is unnecessary to install separately an active carbon absorber and a reverse-washing unit. Since only the active carbon supply means 23 needs to be installed, cost and area required for separately added devices are unnecessary.

The active carbon 22A adsorbed with the humic materials are flowed into the dehydration processing line ($L_3$) via the draw line ($L_2$), and with an aid of the water separator (for example, belt filter) 33, dehydrated and separated with the dehydration cake (gypsum particles) 28.

The humic materials are discharged from the system together with the gypsum dehydration cake 28. Meanwhile, as the dehydrated filtrate 34, the absorbent is transported back to the main body 21a of the device.

Accordingly, in the wet desulfurization device 21 and also in the draw and circulation line of the limestone and gypsum slurry 20 to the dehydration and water discharge line, the humic materials in the limestone and gypsum slurry 20 are suppressed to low concentration, and as a result, it becomes possible to prevent in advance an occurrence of oxidation inhibition during the desulfurization reaction.

As described above, by removing the humic materials with an aid of the active carbon 22A, oxidation inhibition occurring in the wet desulfurization device 21 can be suppressed. Further, as it is unnecessary to have a hyperoxidation state, production of sulfur oxides like dithionate and peroxo disulfate ($S_2O_6^{2-}$ and $S_2O_8^{2-}$) and hexavalent selenium ($Se^{6+}$), that are difficult to be processed, can be suppressed.

Meanwhile, as for the active carbon 22A, it is preferable to use in combination of two or more types having different properties.

That is because, by using plural types of active carbon in combination, not only the removal of humic materials but also adsorption of other components, for example, harmful components like mercury, can be achieved simultanesously.

Examples of the active carbon for adsorbing humic materials include coal-based active carbon, for example, "Spherical Shirasagi LGK-700" (trade name, manufactured by Japan EnviroChemicals Ltd.).

Examples of the active carbon for mercury adsorption include coconut husk-based active carbon, for example, "Spherical Shirasagi MAC" and "Spherical Shirasagi MAC-W" (trade names, manufactured by Japan EnviroChemicals Ltd.). However, specification of the active carbon is not limited to them. Further, for selection of active carbon, in addition to considering the activity of removing humic materials and mercury, those having an adverse effect on existing equipments, in particular, the desulfurizing device, are not desirable (for example, those have a significant reducing activity).

Removal of humic materials is performed by evaluating and adjusting the oxidation reduction state by controlling the oxidation reduction potential (ORP) of the limestone and gypsum slurry 20 in the wet desulfurization device 21.

When the supply amount of the air 31 is increased, an oxidative atmosphere is yielded, and thus the control of the oxidation reduction potential (ORP) is mainly carried out by control of flow amount of oxidation air.

Herein, the reason for supplying the air 31 is, as it causes a milder reaction than addition of other oxidizing agent like manganese (Mn), for example, the hyperoxidation state can be suppressed.

By supplying the air 31, in the desulfurization reaction, oxidation of sulfurous acid gypsum to sulfuric acid gypsum ($CaSO_3+0.5O_2 \rightarrow CaSO_4$) is caused.

Promotion of oxidation or reduction inhibition of mercury is also expected ($Hg^0 \rightarrow Hg^{2+}$).

Next, the step for controlling the oxidation reduction potential (ORP) is explained with reference to FIG. 6.

Figure 6:
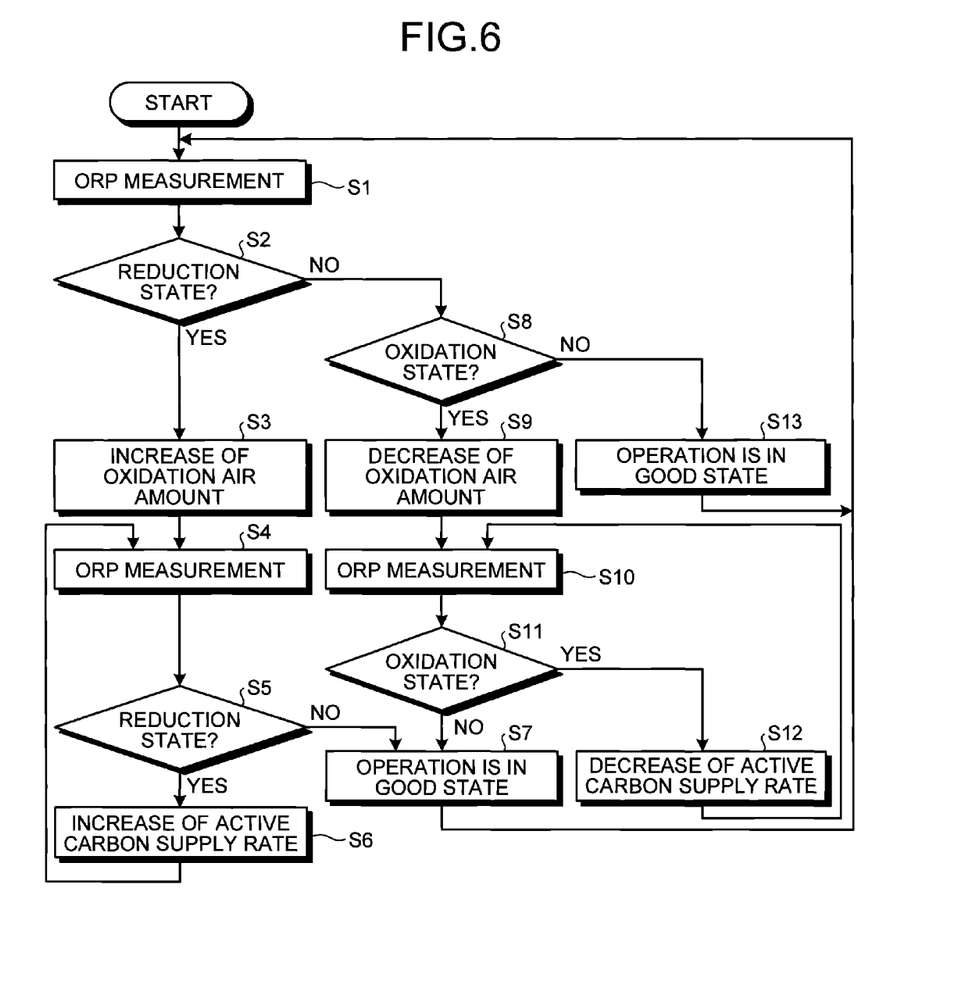
FIG. 6 is a flow chart illustrating the control of oxidation and reduction potential state.

FIG. 6 is a flow chart for controlling the oxidation reduction potential state.

First of all, the oxidation reduction potential (ORP) of the limestone and gypsum slurry 20 is measured (Step 1: S1)

As a result of the measurement, it is determined whether or not the limestone and gypsum slurry 20 is in a reduction state (that is, ORP is 0 mV or less) (Step 2: S2).

As a result of the determination from the Step 2, when the limestone and gypsum slurry 20 is in a reduction state (that is, ORP is 0 mV or less) (Yes), a control of increasing the amount of oxidation air is carried out (Step 3: S3).

After increasing the air amount, the oxidation reduction potential (ORP) is measured again (Step 4: S4).

Based on a result of the measurement, it is determined again whether or not the limestone and gypsum slurry 20 is in a reduction state (that is, ORP is 0 mV or less) (Step 5: S5).

When the limestone and gypsum slurry 20 is in a reduction state (that is, ORP is 0 mV or less) (Yes), a control of increasing the rate for supplying the active carbon 22A is carried out (Step 6: S6). According to increase of the active carbon 22A, the reduced materials are removed.

After removing the reduced materials by increasing the active carbon 22A supplied to the limestone and gypsum slurry 20, the process is brought back to the Step 4 (S4) and the oxidation reduction potential (ORP) of the limestone and gypsum slurry 20 is measured (S4) and the determination is made in the same manner as above (Step 5: S5).

As a measurement result of the Step 4 and determination result of the Step 5, when the limestone and gypsum slurry 20 is not in a reduction state (that is, ORP is 0 mV or more) (No), it is found that the operation is in good state (Step 7: S7), and the process is brought back to the start.

Meanwhile, based on the determination result of the Step 2, when the limestone and gypsum slurry 20 is not in a reduction state (that is, ORP is 0 mV or more) (No), as a next step, a determination is made to see whether or not it is in an oxidation state (that is, ORP is +300 mV or more) (Step 8: S8).

As a result of the determination from the Step 8, when the limestone and gypsum slurry 20 is in an oxidation state (that is, ORP is +300 mV or more) (Yes), a control of decreasing the amount of oxidation air is carried out (Step 9: S9).

After decreasing the amount of oxidation air, the oxidation reduction potential (ORP) is measured again (Step 10: S10).

Based on a result of the measurement, a determination is made again to see whether or not the limestone and gypsum slurry 20 is in an oxidation state (that is, ORP is +300 mV or more) (Step 11: S11).

As a measurement result of the Step 11, when the limestone and gypsum slurry 20 is not in an oxidation state (that is, ORP is +300 mV or less) (No), it is found that the operation is in good state (Step 7: S7), and the process is brought back to the start.

As a measurement result of the Step 11, when the limestone and gypsum slurry 20 is in an oxidation state (that is, ORP is +300 mV or more) (Yes), a control of decreasing the rate for supplying the active carbon 22A is carried out (Step 12: S12).

According to decreasing the active carbon 22A, the removal amount of reduced materials is lowered. Then, the process is brought back to the Step 10 at which the oxidation reduction potential (ORP) is measured again (S10), and then a determination is made again to see whether or not it is in an oxidation state (Step 11: S11).

Meanwhile, when the limestone and gypsum slurry (20) is not in an oxidation state (that is, ORP is +300 mV or less) (No) based on a result of the determination from the Step 8, it is found that the operation is in good state (Step 13: S13), and the process is brought back to the start.

The oxidation reduction state of the limestone and gypsum slurry 20 in the wet desulfurization device 21 is checked as described above.

Further, after comparing the result with a pre-determined evaluation condition, when it is found to be at reduction side, a control for increasing the addition amount of active carbon is performed. On the other hand, when it is found to be at oxidation side, a control for decreasing the addition amount of active carbon is performed.

In the present example the pre-determined range indicates that determination range for the oxidation reduction potential (ORP) is from 0 to +300 mV. However, the invention is not limited to it, and the determination can be made with the range of from +100 to +200 mV, for example.

As described above, according to the invention, control of oxidation and reduction state can be carried out by increasing or decreasing the amount of oxidation air. Specifically, when it is found to be at reduction side, the addition amount of active carbon is increased. On the other hand, when it is found to be at oxidation side, the addition amount of active carbon is decreased. In general, it is achieved by control of amount of oxidation air. However, operation by varying the amount of oxidation air is limited in terms of capacity of facilities. For such reasons, if the amount of oxidation air is within the range in which it can be controlled, increasing or decreasing the oxidation air is performed. If it is a case in which the oxidation reduction state cannot be modified, the active carbon 22A is added to modify the oxidation reduction state.

In the present example, ORP of the limestone and gypsum slurry 20 is taken as a yardstick for determination. However, in addition to the determination based on ORP, concentration of sulfurous acid ion ($SO_3^{2-}$) can be taken as a yardstick for determination.

For such case, value of the liquid phase $SO_3$ corresponding to "0 mV", which is the minimum value of ORP, is about "5.0 mmol/L", and value of the sulfurous acid ion ($SO_3^{2-}$) corresponding to "+300 mV", which is the maximum value of ORP, is about "0.5 mmol/L".

Further, when the determination is made at one point, it is also possible that the value of sulfurous acid ion ($SO_3^{2-}$) is determined as "1.0 mmol/L".

Thus, instead of the control based on ORP, it is possible to control the increase or decrease of the air amount and control the increase or decrease of the active carbon 22A while taking the sulfurous acid ion ($SO_3^{2-}$) concentration as a yardstick for determination.

Herein above, the examples according to removal of humic materials by using the active carbon 22A are explained. However, the invention is not limited to them, and as illustrated in FIG. 3, it is also possible that the aggregation assistant 22B is supplied to the limestone and gypsum slurry 20 via an aggregation assistant supply means 23B to remove the humic materials.

Preferred examples of the aggregation assistant 22B include an iron-based aggregation agent.

Specific examples include ferric sulfate, ferrous sulfate, ferric chloride, copper chloride, ferric polysulfate, ferric polychloride, iron-silica inorganic polymer aggregating agent iron salt, and manganese salt.

By using the aggregation assistant 22B, humic materials or the like that are the oxidation inhibiting material in limestone and gypsum slurry can be solidified and excluded from a liquid phase. As a result, the ability of controlling ORP is dramatically improved.

Addition concentration of the aggregation assistant 22B is preferably in the range of 0.1 to 100 mgFe/L or so.

Examples of other aggregation assistant include an aluminum-based aggregation agent (PAC (aluminum polychloride, $[Al_2(OH)_nCl_{6-n}]_m$), sulfuric acid band ($Al_2(SO_4).nH_2O$)), and a polymer aggregation agent. However, they are not suitable in that they all have an adverse effect on the reaction within the desulfurization device. In particular, the aluminum-based aggregation agent is not desirable in that it lowers the dissolution rate of limestone ($CaCO_3$). Further, as the polymer aggregation agent lowers the oxidation rate of sulfurous acid and inhibits a desulfurization activity of the desulfurization device, it is also undesirable.

Herein, with regard to the addition type of the aggregation assistant 22B, addition in a solution state is preferable.

In addition, because it needs to be rapidly admixed with the limestone and gypsum slurry (alkali absorbent) 20 of the wet desulfurization device 21 or the supply water 30 added to the wet desulfurization device 21, it is desirable to have a stirring and mixing unit (not illustrated).

Figure 5:
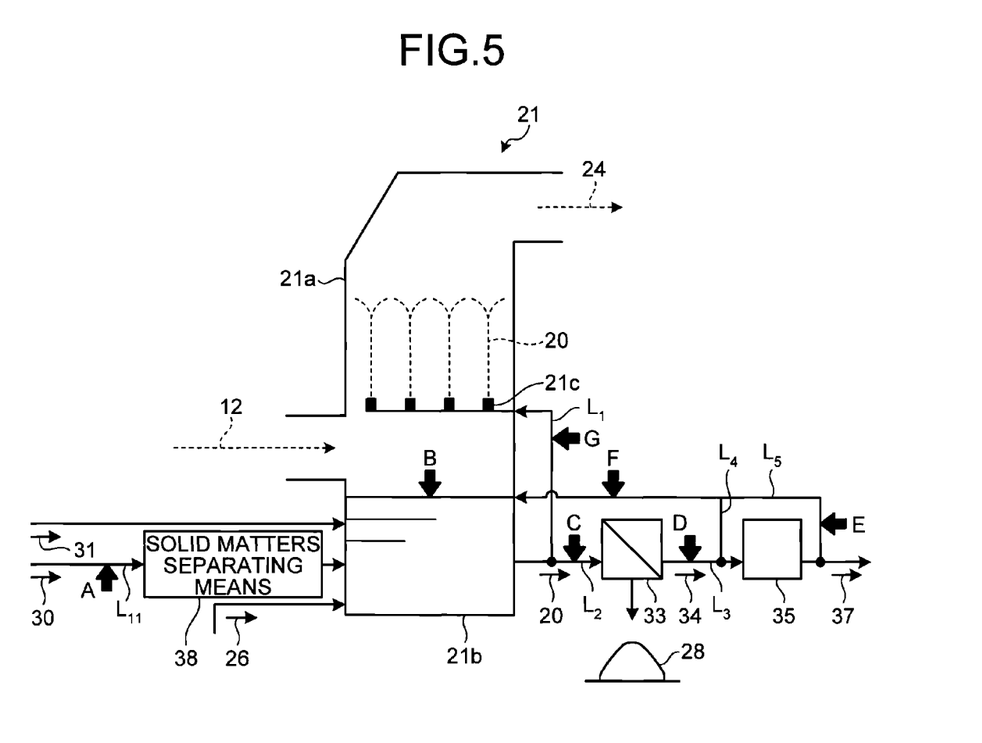
FIG. 5 is a diagram of another wet desulfurization device according to the examples of the invention.

FIG. 5 is a diagram of another wet desulfurization device according to the present example.

When it is applied for the water 30 for supply, as illustrated in FIG. 5, it is also possible that a solid and liquid separating means (for example, sand filter means) 38 is installed to remove the solid matters. For other cases, a separator for the limestone and gypsum slurry (alkali absorbent) 20, for example, a liquid cyclone or a belt type vacuum dehydrator can be also used.

As explained in the above, according to the invention, by supplying a material for removing humic materials, for example, the removal assistant 22 like the active carbon 22A and the aggregation assistant 22B, to a limestone and gypsum slurry, the humic materials are removed, and thus oxidation inhibition occurring in a wet desulfurization device can be suppressed. Further, since it is unnecessary to have a hyper-oxidation state, production of sulfur oxides like dithionate and peroxo disulfate ($S_2O_6^{2-}$ and $S_2O_8^{2-}$) and hexavalent selenium ($Se^{6+}$), that are difficult to be processed, can be suppressed.

Industrial Applicability

As described above, according to the system for processing mercury in flue gas related to the invention, humic materials are removed by active carbon, and therefore oxidation inhibition occurring in a wet desulfurization device can be suppressed.

REFERENCE SIGNS LIST

10 system for processing mercury in flue gas
11 boiler
12 flue gas
13 flue gas duct
14 $NH_4Cl$ solution
16 ammonium chloride ($NH_4Cl$) solution supply means (reduction oxidation assistant supply means)
17 reduction denitration device (reduction denitration means)
18 heat exchanger (air heater: AH)
19 precipitator
20 limestone and gypsum slurry (alkali absorbent)
21 wet desulfurization device
22 removal assistant
22A active carbon
22B aggregation assistant
23 removal assistant supply means
23A active carbon supply means
23B aggregation assistant supply means

The invention claimed is:

1. A system for removing Hg contained in flue gas from a boiler, the system comprising:
   a heat exchanger for performing heat exchange of the flue gas from the boiler;
   a precipitator for removing soot and dust in the flue gas;
   a wet desulfurization device for removing mercury oxide $Hg^{2+}$ in the flue gas with a limestone and gypsum slurry, the wet desulfurization device including a circulation line for circulating the limestone and gypsum slurry;
   a water supply line for supplying water containing reductive and humic material to the wet desulfurization device; and
   a removal assistant supply unit that supplies a removal assistant for removing the reductive and humic material to the water supply line or circulation line.

2. The system according to claim 1, further comprising a denitration unit having a denitration catalyst for oxidizing metallic mercury($Hg^0$) by denitration of NOx in the flue gas.

3. The system according to claim 2, further comprising a reduction oxidation assistant supply unit that supplies a reduction oxidation assistant to a flue gas duct in the downstream of the boiler,
   wherein NOx in the flue gas is reduced with the reduction assistant by the denitration unit and the metallic mercury($Hg^0$) is oxidized in the coexistence of an oxidation assistant.

4. The system according to claim 1, wherein the removal assistant supply unit supplies a plurality of types of removal assistants.

5. The system according to claim 1, wherein a supply amount of the removal assistant is determined by an oxidation reduction state of the limestone and gypsum slurry.

6. The system according to claim 1, wherein an oxidation reduction state in the desulfurization device is determined by oxidation reduction potential (ORP) of the limestone and gypsum slurry or sulfurous acid ion ($SO_3^{2-}$) concentration.

7. The system according to claim 1, wherein a plurality of types of removal assistant are used.

\* \* \* \* \*